United States Patent
Mendiratta et al.

(10) Patent No.: US 10,200,418 B2
(45) Date of Patent: Feb. 5, 2019

(54) CALL CONTEXT CONVEYANCE

(71) Applicant: Avaya Inc., Basking Ridge, NJ (US)

(72) Inventors: Harsh V. Mendiratta, East Brunswick, NJ (US); Joaquin Omar Alvarado, Eatontown, NJ (US); Gordon R. Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 369 days.

(21) Appl. No.: 14/472,115

(22) Filed: Aug. 28, 2014

(65) Prior Publication Data

US 2015/0222671 A1    Aug. 6, 2015

Related U.S. Application Data

(60) Provisional application No. 61/934,542, filed on Jan. 31, 2014.

(51) Int. Cl.
 *H04L 29/06* (2006.01)

(52) U.S. Cl.
 CPC ...... *H04L 65/1096* (2013.01); *H04L 65/1006* (2013.01); *H04L 65/1069* (2013.01)

(58) Field of Classification Search
 CPC ..... H04L 29/08; H04L 12/66; H04L 65/1096; H04L 65/1069; H04L 67/18–67/20
 USPC ............ 379/265.13, 265.11, 265.01, 265.05, 379/265.06, 207.01, 212.01, 389, 379/352–356; 455/414.4
 See application file for complete search history.

(56) References Cited

U.S. PATENT DOCUMENTS

| | | | |
|---|---|---|---|
| 7,706,785 B2 * | 4/2010 | Lei | H04M 3/53 370/352 |
| 7,944,813 B1 * | 5/2011 | Hurtta | H04L 65/1069 370/218 |
| 8,442,227 B1 | 5/2013 | Yoakum et al. | |
| 8,493,965 B2 | 7/2013 | Kumarasamy et al. | |
| 8,718,042 B2 * | 5/2014 | Strebel | H04L 12/66 370/352 |
| 2003/0061354 A1 | 3/2003 | Burg et al. | |
| 2004/0068574 A1 | 4/2004 | Costa Requena et al. | |
| 2004/0086102 A1 | 5/2004 | McMurry et al. | |
| 2006/0078096 A1 | 4/2006 | Poyhonen et al. | |
| 2007/0140150 A1 | 6/2007 | Beck et al. | |
| 2007/0201665 A1 | 8/2007 | Kocan et al. | |
| 2007/0248221 A1 | 10/2007 | Chatterjee et al. | |
| 2008/0112551 A1 | 5/2008 | Forbes et al. | |
| 2008/0114594 A1 | 5/2008 | Forbes et al. | |
| 2009/0164639 A1 | 6/2009 | Sylvain | |

(Continued)

OTHER PUBLICATIONS

Extended Search Report for European Patent Application No. 15153233.0, dated Jul. 2, 2015 6 pages.

(Continued)

*Primary Examiner* — Hanh N Nguyen
(74) *Attorney, Agent, or Firm* — Sheridan Ross P.C.

(57) ABSTRACT

A communication system, method, and components are described. Specifically, a communication system having the ability to carry a transitive context and communicate the transitive context to new participant user agents for continuity through all related call dialogs is disclosed. The transitive context communication is possible through the use of a newly created SIP dialog using a REFER message and/or an INVITE message for all call flows and topology change operations.

20 Claims, 9 Drawing Sheets

(56) References Cited

U.S. PATENT DOCUMENTS

| | | |
|---|---|---|
| 2009/0164645 A1 | 6/2009 | Sylvain |
| 2009/0262668 A1 | 10/2009 | Hemar et al. |
| 2010/0235856 A1 | 9/2010 | Huang |
| 2010/0266111 A1 | 10/2010 | Crausaz et al. |
| 2011/0055412 A1 | 3/2011 | Kongalath et al. |
| 2011/0072144 A1 | 3/2011 | Fikouras et al. |
| 2011/0078319 A1 | 3/2011 | Ishida |
| 2013/0128865 A1* | 5/2013 | Wu .................... H04W 36/00 370/331 |
| 2013/0246636 A1 | 9/2013 | Yoakum et al. |

OTHER PUBLICATIONS

Official Action with English Translation for Korea Patent Application No. 2015-0014362, dated Aug. 20, 2015 8 pages.
Official Action for European Patent Application No. 15153233.0, dated Jun. 29, 2016 4 pages.
Official Action with English Translation for Korea Patent Application No. 2015-0014362, dated Feb. 26, 2016 12 pages.
Notice of Allowance for Korea Patent Application No. 2015-0014362, dated Aug. 29, 2016 3 pages.
"Translation routing", Cisco Support Community, Discussions, Feb. 26, 2007, Retrieved from https://supportforums.cisco.com/message/1035916?start=0, 4 pages.
"Working with Translation Routes", A White Paper from Cisco Systems, Inc., Application Technology Group, customer Contact Business Unit, Jul. 8, 2008, 8 pages.

* cited by examiner

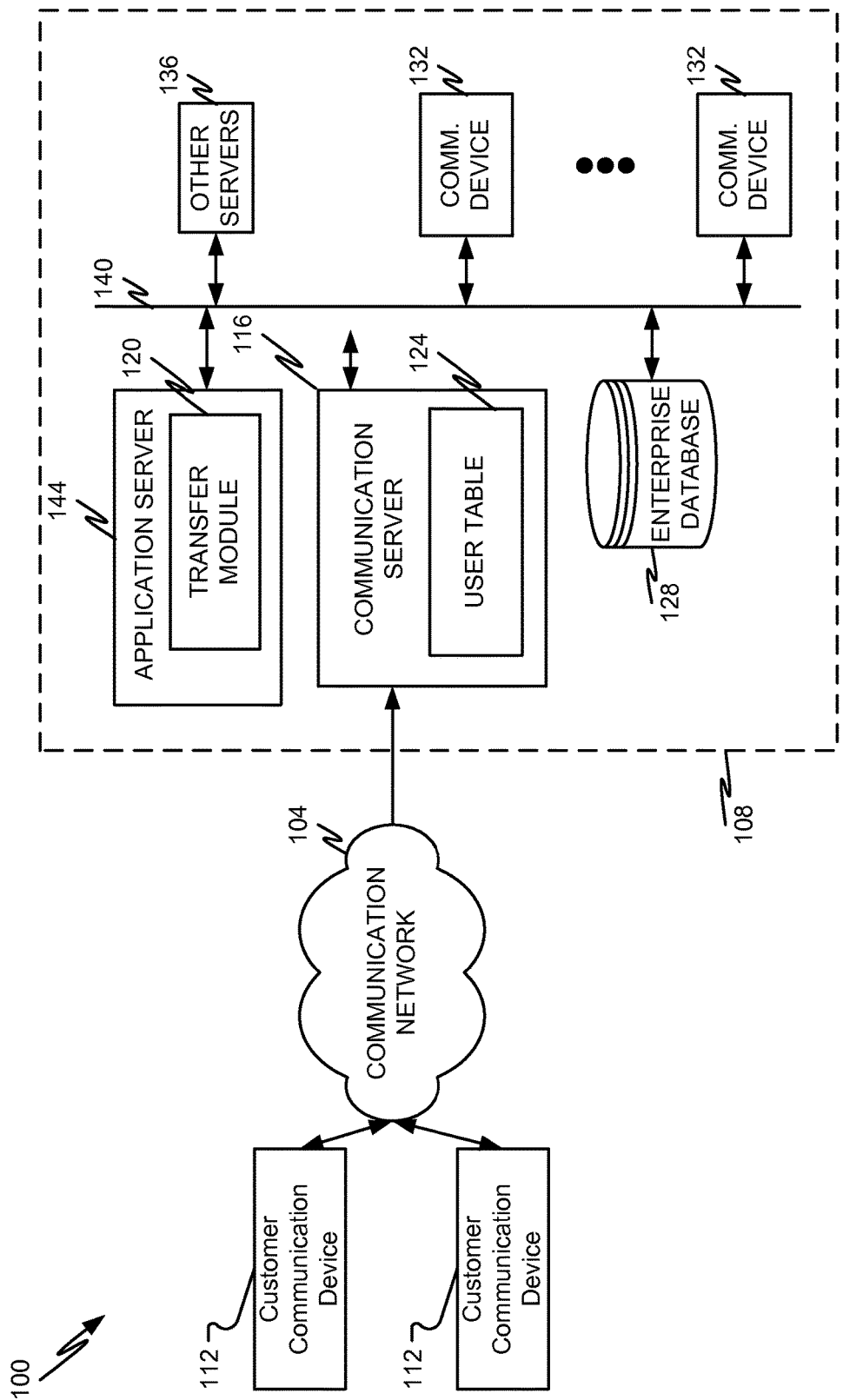

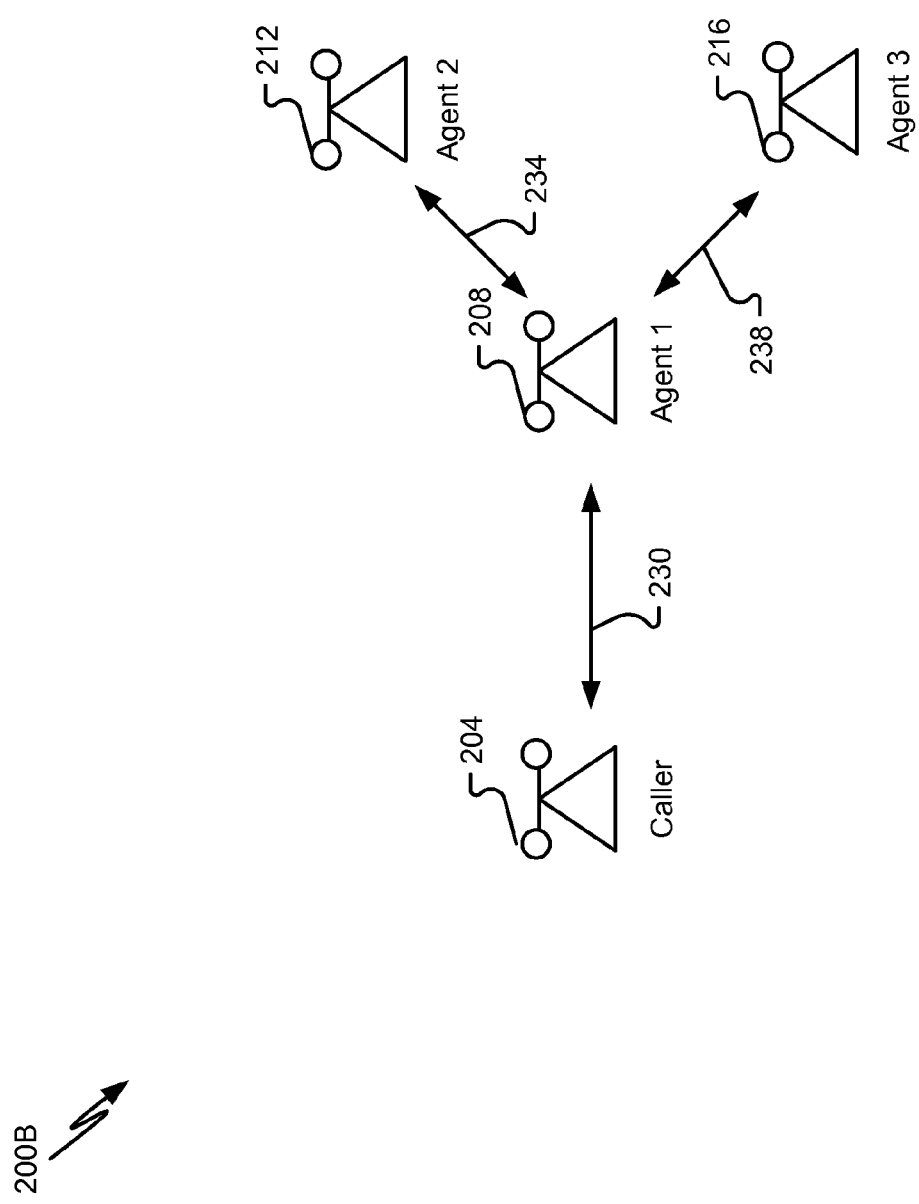

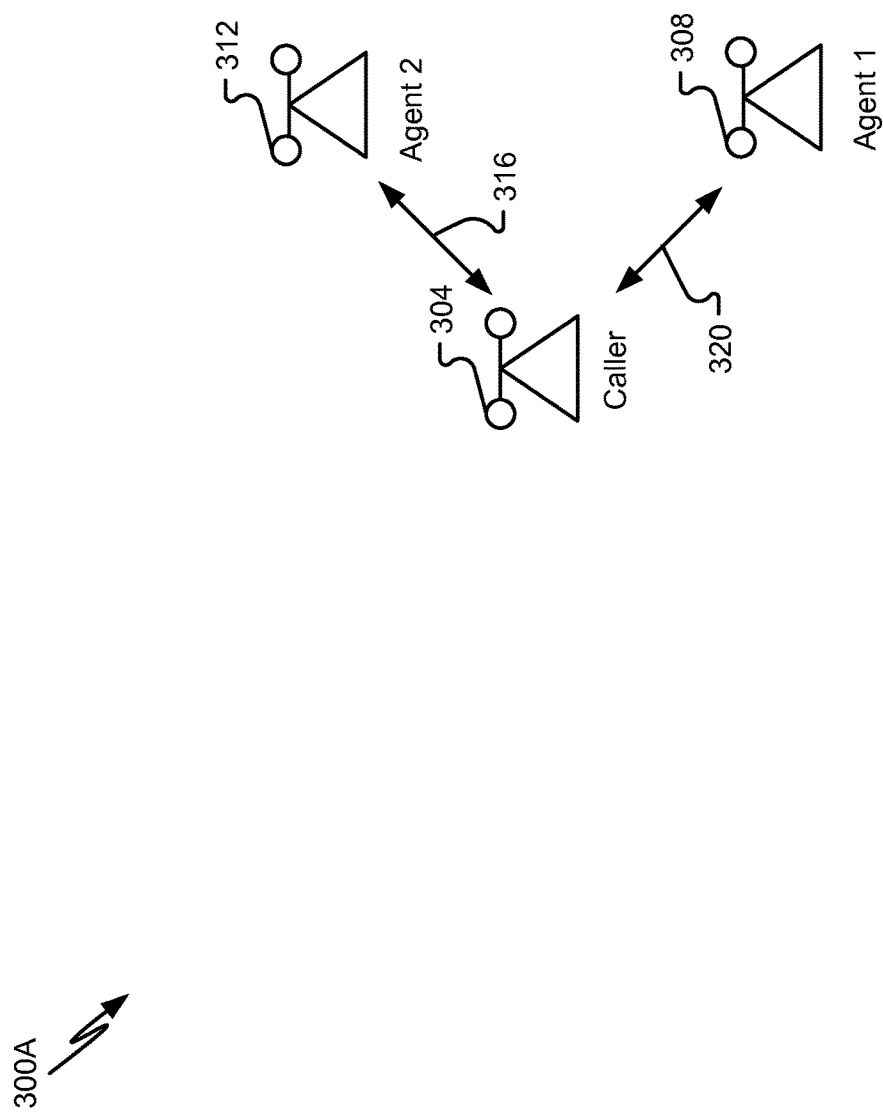

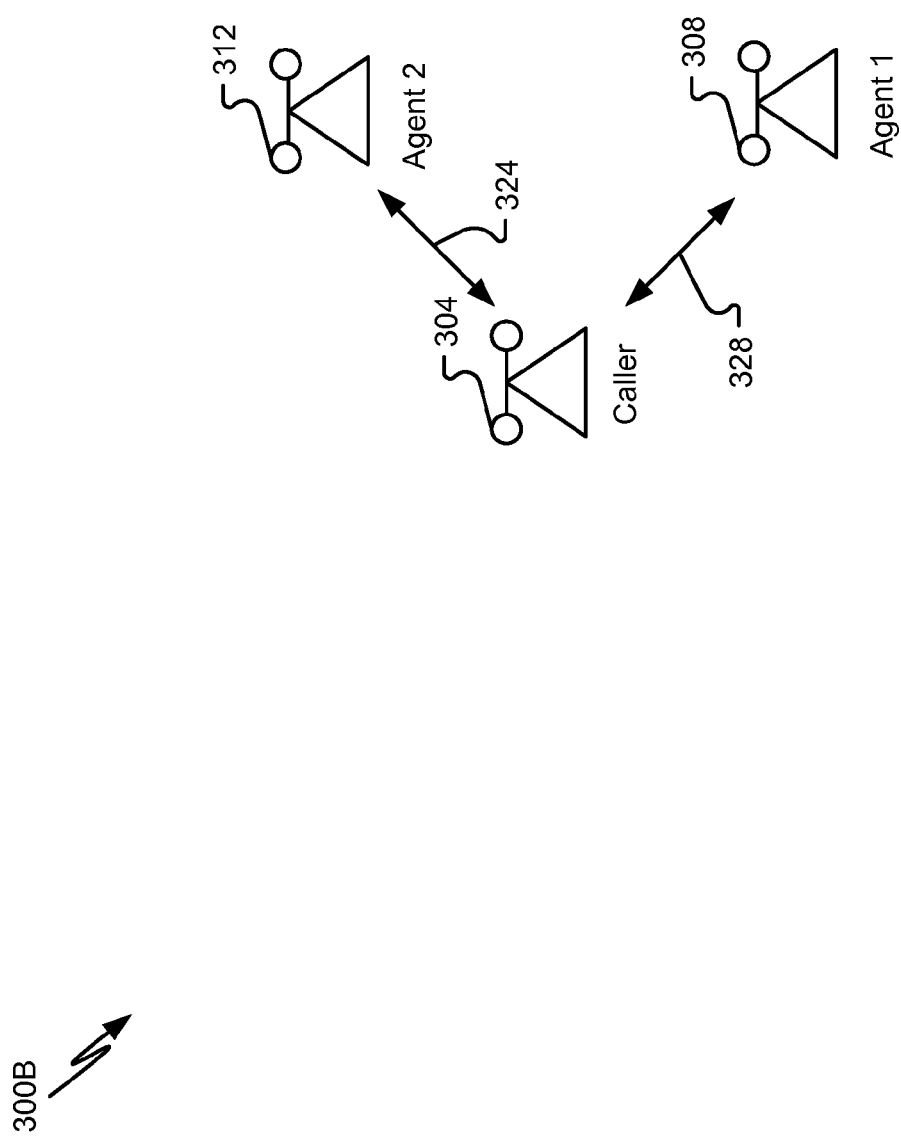

```
REFER sip:b@atlanta.example.com SIP/2.0
To: <sip:b@atlanta.example.com>;tag=4992881234
From: <sip:a@atlanta.example.com>;tag=193402342
Call-ID: 898234234@agenta.atlanta.example.com
CSeq: 93809824 REFER
Refer-To: Alice <sip:a@biloxi.example.com>
Content-Type: application/avaya-context
Content-Disposition: Relegate
Content-Length: [...]

User-To-User: Now is the time for all good men
Context: To come to the aid of their party.

MESSAGEBODYTOBECARRIEDTOTHETARGETUA
```

```
INVITE sip:a@biloxi.example.com SIP/2.0
To: Alice <sip:a@biloxi.example.com>
From: Charlie <sip:charlie@atlanta.com>;tag=1928301774
Call-ID: a84b4c76e66710@pc33.atlanta.com
CSeq: 314159 INVITE
User-To-User: Now is the time for all good men
Context: To come to the aid of their party.
Content-Type: multipart-mixed;boundary="b1"
Content-Length: [...]

--b1
Content-Type: application/sdp

[...]
--b1
Content-Type: application/avaya-context

MESSAGEBODYTOBECARRIEDTOTHETARGETUA
--b1--
```

CALL CONTEXT CONVEYANCE

CROSS-REFERENCE TO RELATED APPLICATIONS

This application claims the benefit of U.S. Provisional Patent Application Ser. No. 61/934,542, filed in the U.S. Patent Office on Jan. 31, 2014, the entire disclosure of which is hereby incorporated herein by reference.

FIELD OF THE DISCLOSURE

The present disclosure is generally directed toward communications and more specifically toward conveying context into newly created sessions and through existing sessions.

BACKGROUND

Using Session Initiation Protocol (SIP), calls can be moved around using what is known as call redirection. Using SIP, applications may also send requests to initiate new calls. Call redirection may include but is not limited to common movements of a call like transferring a call to another person, conferencing participants into calls, joining two calls into a conference, and extending a call where a call moves from one device to another and the users remain the same. Call initiation may include manual call out from a person or automatic call out from a communication system. When a call topology changes or a particular type of call is initiated, a calling and/or called party may have no idea why the call is coming to him or her or why a call should go out. Lack of context can be particularly problematic for calls received by, initiated by, and subsequently moved around inside a contact center.

One example of a redirected call with no context delivery is the transfer of a call to a contact center supervisor. When the transferred call comes in to the supervisor, the supervisor may have no idea what to expect since the transferred call provides no context. The lack of context is typically handled today in contact centers with a feature known as attended transfer, where an agent verbally relays the context of the call to the supervisor to whom the call is being transferred. Once the context is verbally relayed, the call is transferred to the supervisor and the agent drops off of the call. Other strategies that attempt to relay some call information include Hypertext Transfer Protocol (HTTP)/web information, case identification (ID) number, ticket/work item number, customer number, customer information tagging, information appending, etc. A standard approach to provide context for variety of call topologies, including behavior for called, calling, requested, moved, and transferred calls is needed.

SUMMARY

It is with respect to the above issues and other problems that the embodiments presented herein were contemplated. In particular, embodiments of the present disclosure propose a communication system, a method, and components to carry and deliver context that overcomes the above-noted shortcomings. Call context conveyance creates a relative or transitive context that may be transferred to a newly created Session Initiation Protocol (SIP) dialog in a REFER message or in an INVITE message for a establishing a new call respectively to provide information for and continuity through all related call dialogs.

When a call topology changes and new participants are added, it may be useful to have the current call's context and subsequent application context carried and communicated to a new participant User Agent (UA). One common pattern across features is where one UA redirects a second UA, which may result in a new dialog that creates requests, resulting in the additional modification of topologies and additional context.

At a broad level, there are two types of contexts; (1) transitive for a new call dialog and (2) relative for a current call dialog. The transitive context may be transferred to a newly created call dialog. Typically, the transitive context is included in a REFER message. It may be possible to convey it in other requests, including in call transfer scenarios and in an INVITE request. The receiving UA may apply the transitive context to a new call dialog created with a received INVITE with Replaces (INVITE-R) to match information to an earlier call dialog.

Relative call context syntax that can be used by SIP elements may convey notes about a current call. A call context description may be delivered as application/ms-conversation-context+xml content in the body of a SIP INVITE request, initiating a new call in the case of a transfer. A contextData element may convey textual notes about the call that an author created to provide further context about the related call. The contextData element must be present in the call context data and must appear only once. Syntax that is normally used for context may be for an existing call rather than for a newly created dialog which may have transitive context.

Transitive context delivery may be implemented as a standard approach to get context, including behavior for called, calling, and transfer (REFER method, primitives), allowing for the creation of roles in the SIP REFER method and defines context information within primitives. The transitive context delivery may also allow the launching of a new request that carries some context that works for all transfer flows and topology change operations.

Based on the desired handling, the transitive context may be divided into two categories, consume and relegate. The consume context is for the consumption of the request recipient UA in the context of a new call (e.g., redirected UA in the redirected call). The recipient UA applies the context to the new dialog but does not convey it to the remote UA. Unlike the consume context, the relegate context is not for the consumption of the recipient UA. Instead, the recipient UA is expected to communicate it to the remote UA (e.g., in the redirected call, the redirected UA conveys the relegate context to the remote UA by copying the relegate context to the new dialog creating the request). The nature of transitive context of consume or relegate is transmitted in the Content-Disposition header.

To include specific SIP headers in the redirected requests, the redirecting UA may include header names and values encoded in ampersand separated hname=hvalue pairs in the Refer-To header (standard behavior). If the size of the Refer-To header is more than a predetermined size (e.g., 1024 bytes), the redirecting UA may include the headers in a multi-part MIME attachment with content type of 'application/avaya-context-SIP-headers'. The redirected UA may include the ampersand separated headers from the Refer-To header in the new request. If the REFER request contains multi-party MIME attachment for the SIP headers, the redirected UA may copy the headers from the attachment to the new request.

In accordance with at least some embodiments of the present disclosure, a method of providing transitive context between a context originator/director, a directed participant, and a target is provided which generally comprises:

obtaining transitive context information;

configuring a Session Initiation Protocol (SIP) message to be transmitted in connection with call establishment;

including the transitive context information in the SIP message;

wherein the transitive context information is obtained for a first call involving a first user and a second user, but not a third user and wherein the SIP message is configured to be transmitted in connection with establishing a second call between the third user and at least one of the first user and the second user;

wherein the transitive context information is obtained for both (i) a first call involving a first user and a second user as well as (ii) a second call involving the first user and a third user, and wherein the SIP message is configured to be transmitted in connection with establishing a third call between the second user and the third user;

wherein the transitive context information is obtained in the absence of a call, and wherein the SIP message is configured to be transmitted in connection with establishing a first call between a first user and a second user;

wherein the transitive context information is identified as belonging to one of two categories of transitive context information: (1) consume and (2) relegate;

wherein the transitive context information is identified as being consume context and wherein the transitive context information is used in at least one of the second call by the second user, in the third call by the second user, and in the first call by the second user;

wherein the transitive context information is identified as being relegate context and wherein the method further comprises:

conveying at least some of the transitive context information from the SIP message to a target user of the call thereby providing the target user with contextual information about the incoming call;

wherein the transitive context information is included in the at least one of a Content-Disposition header of the SIP message and a MIME attachment in the SIP message;

wherein the SIP message comprises at least one of an INVITE message, an INVITE with Replaces message, a REFER message, and a REFER with Replaces message;

wherein the transitive context information is obtained in response to a first call changing topology from a first configuration to a second configuration; and wherein the transitive context information includes a data element that conveys notes about the call, wherein the notes are created by at least one user involved in the call, and wherein the notes are used in a subsequent call that occurs after the call in which the data element is included is completed.

The term "automatic" and variations thereof, as used herein, refers to any process or operation done without material human input when the process or operation is performed. However, a process or operation can be automatic, even though performance of the process or operation uses material or immaterial human input, if input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The phrase "call topology" as used herein refers to a model that depicts physical and conceptual portions of a telephone call between telecommunication components such as phones, servers, tablets, computers, endpoints, etc. Call topology change operations may include but are not limited to make, receive, transfer, conference, join, and extend calls.

The term "primitive" as used herein refers to software functionality provided by SIP. SIP provides primitives to deliver basic services rather than performing services directly, including but not limited to creating a call, disconnecting a call, accepting and/or rejecting a call, joining and/or separating call legs, cancelling a call, and parking a call. Examples of primitives include INVITE, PRACK, REGISTER, CANCEL, BYE, etc.

The term "customer" or "client" denotes a party patronizing, serviced by, or otherwise doing business with a contact center, business, or enterprise.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 1 is a block diagram of a communication system in accordance with embodiments of the present disclosure;

FIG. 2B is a block diagram of second call topology in accordance with embodiments of the present disclosure;

FIG. 3A is a block diagram of a third call topology in accordance with embodiments of the present disclosure;

FIG. 3B is a block diagram of a fourth call topology in accordance with embodiments of the present disclosure;

FIG. 4 is a block diagram of a SIP message in accordance with embodiments of the present disclosure;

FIG. 5 is a block diagram of a SIP message in accordance with embodiments of the present disclosure;

DETAILED DESCRIPTION

Figure 2A:
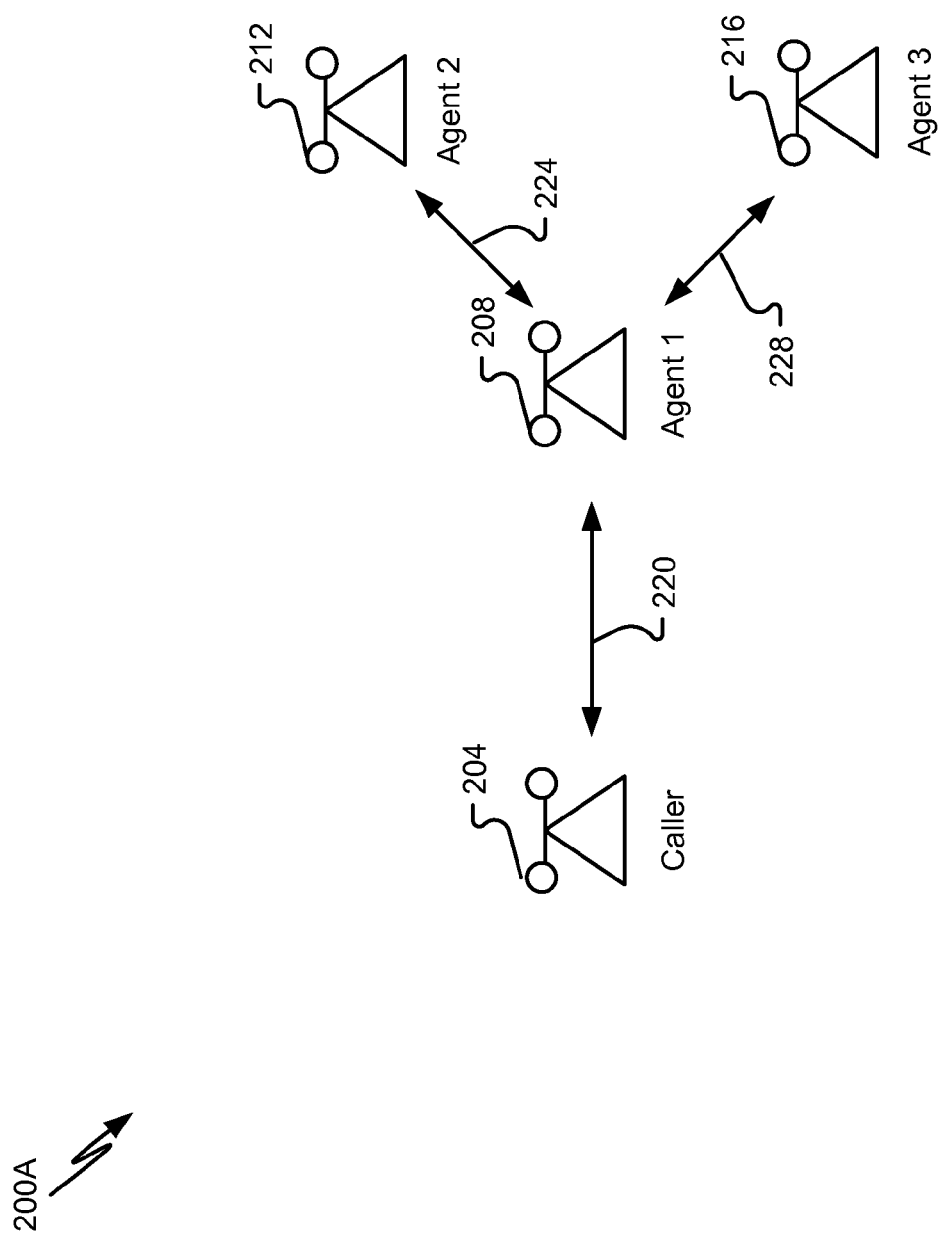
FIG. 2A is a block diagram of first call topology in accordance with embodiments of the present disclosure.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

With reference initially to FIG. 1, a communication system 100 will be described in accordance with embodiments of the present disclosure. The communication system 100 is depicted as including an enterprise network 108 that is connected to one or more external communication devices 112 via a communication network 104. Components of the enterprise network 108 are depicted as including a communication server 116, a plurality of communication devices 132, other servers 136, an application server 144, and an enterprise database 128. It should be appreciated that one or more of the components depicted as being within the enterprise network 108 may alternatively or additionally be provided outside the enterprise network 108.

In some embodiments, the communication network 104 may correspond to any type of known communication network. Examples of a suitable communication network 104 include, without limitation, the Internet, the Public Switched Telephone Network (PSTN), a cellular network, an IMS network, an ISDN network, a Voice over IP (VoIP) network, any other packet-switched network, any other circuit-switched network, or combinations thereof. In one configuration, the communication network 104 is a public network supporting the TCP/IP suite of protocols.

The external customer communication devices 112 are generally referred to as "external" because they are either not under the direct control of the enterprise administering the enterprise network 108 or have a decreased level of trust with the enterprise network 108 as compared with communication devices 132 that are within the enterprise network 108. Exemplary types of external communication devices 112 include, without limitation, cellular phones, laptops, tablets, Personal Computers (PCs), Personal Digital Assistants (PDAs), digital phones, analog phones, and the like.

The communication devices 132 within the enterprise network 108, similar to the external communication devices 112, may correspond to user communication devices and, in some embodiments, may correspond to a UA or multiple UAs of enterprise users. Examples of communication devices 132 include, without limitation, a telephone, a softphone, a cellular phone, a multi-speaker communication device (e.g., conference phone), a video phone, a PC, a laptop, a tablet, a PDA, a smartphone, a thin client, or the like. It should be appreciated that a communication device 132 may be configured to support single or multi-user interactions with other communication devices 132 within the enterprise network 108 as well as other communication devices 112 that are external to the enterprise network 108.

The communication devices 112, 132 may include any collection of components (hardware and software) that enable users to exchange media (e.g., voice, video, etc.), data (e.g., emails, Short Message Service (SMS) messages, Multimedia Message Service (MMS) messages, files, presentations, documents, etc.) with one another's communication devices over the communication network 104 and/or within the enterprise network 108.

The enterprise network 108 may correspond to either a single-location enterprise network or a multi-location enterprise network. A single-location enterprise network may comprise a network backbone 140 that corresponds to a Local Area Network (LAN) that includes wired (e.g., Ethernet) and/or wireless (e.g., Wi-Fi) technologies. A multi-location enterprise network may comprise a network backbone 140 that is a Wide Area Network (WAN), which connects a plurality of LANs or similar network locations via one or more untrusted networks, such as the communication network 104.

In some embodiments, the communication server 116 may be used to help establish communication sessions and/or move signaling paths, change call topology, etc. Specifically, the communication server 116 may include a Private Branch eXchange (PBX), an enterprise switch, an enterprise server, combinations thereof, or any other type of telecommunications system switch or server. The communications server 116 is, in some embodiments, configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, Multi-Vantage Express™, and combinations thereof.

As noted above, although only a single communications server 116 is depicted in FIG. 1, two or more communications servers 116 may be provided in a single enterprise network 108 or across multiple separate LANs 140 owned and operated by a single enterprise. In configurations where an enterprise or an enterprise network 108 includes two or more communications servers 116, each server 116 may comprise similar functionality, but may be provisioned for providing its features to only a subset of all enterprise users. In particular, a first communications server 116 may be authoritative for and service a first subset of enterprise users whereas a second communications server 116 may be authoritative for and service a second subset of enterprise users, where the first and second subsets of users generally do not share a common user.

Additionally, multiple servers 116 can support a common user community. For example, in geo-redundant and other applications where users aren't necessarily bound to a single application server, there may be a cluster of equivalent servers where a user can be serviced by any server in the cluster.

A communications server 116 can be configured to include user communication preferences in a user table 124, which map, for a corresponding (enterprise subscriber) user, to a set of communication preferences to be invoked for an incoming and/or outgoing contact for each user for whom it is authoritative. Even more specifically, communications between internal enterprise users (e.g., internal communication devices 132) may first be serviced by the originating user's authoritative communications server 116 during the origination phase of communications set-up. After the origination phase is complete, the authoritative communications server 116 of the originating (or calling) user may be invoked to provide transitive context for a redirected user agent. In some embodiments, the communications server 116 for the originating, terminating, and transferred user may be the same, but this is not necessarily required. In situations where more than two enterprise users are involved in a communication session, authoritative communications servers 116 for each of the involved users may be employed without departing from the scope of the present invention. Additionally, the authoritative communications servers 116 for each user may be in the same enterprise network 108 or in different enterprise networks 108. When a customer communication device 112 is involved in at least one of a call and/or transfer, then yet another communication server 116 may carry and deliver transitive context, as needed.

In accordance with at least some embodiments of the present disclosure, a transfer module 120 comprises an application that may reside on an application server 144 or alternately may reside on a communication server 116. In some embodiments, the communication server 116 may not actually know the transfer module 120 to be different than any other sequenced application or feature. The transfer module 120, in operation, may facilitate an unattended, attended and/or semi-attended transfer between users within the enterprise network 108, in a different enterprise network, and/or at an external communication device 112. The transfer module 120 may comprise the functionality necessary to enable call topology changes with transitive context between users operating different endpoints and/or being connected to networks having different transfer behavior definitions.

Specifically, the transfer module 120 may be configured to: (1) create context from a call based on a user or higher application directive on what information to include as consume or relegate context; (2) send an in-dialog REFER with Replaces (REFER-R) to a caller with the transitive context and (3) copy the relegate context to the dialog creating request.

It should be appreciated that the transfer module 120 may reside, completely or partially, in the communication server 116 or any other server 136 or device depicted in any of the figures. In some embodiments, the transfer module 120 may be implemented by a server and/or may be operational in a communication device 112, 132 that can participate in a communication session.

The other servers 136 may include any other type of server or switch needed for operating the enterprise network 108. Examples of suitable other servers 136 include, without limitation, presence servers, Instant Messaging (IM) servers, email servers, voicemail servers, virtual machines, web servers, call center servers, Interactive Voice Response (IVR) units, etc.

The enterprise database 128 may include information regarding enterprise users and/or non-enterprise users. Specifically, the enterprise database 128 may comprise information that identifies enterprise users, their relative position within the enterprise hierarchy, network permissions, communication permissions, Customer Relationship Management (CRM) information, etc. The enterprise database 128 may be any type of data storage system and may include one or more hierarchical databases, relational databases, or any other type of known database structure such as a SQL database. The enterprise database 128, although depicted as being separate from the user table 124 in the communication server 116, may comprise the data regarding user communication preferences user table 124 and may be accessible to the communication server 116 via a database lookup or query/response protocol.

It should be appreciated that some or all of the functions depicted in FIG. 1 may be co-hosted and/or co-resident on a single server. The depiction of components in FIG. 1 is generally intended to be a logical depiction of the components of the system 100.

FIG. 2A is an example of a consult call and context continuation 200A where a redirected UA can support an enterprise-specific-context extension (or custom context extension). In a non-limiting example, a call comes into a contact center. A Caller 204 speaks with Agent 1 208. A context can be created as a result of the interaction 220 between the Caller 204 and Agent 1 208. Agent 1 208 may not have an answer to a question presented by the Caller 204. Agent 1 208 decides that the best course of action may be to ask another member of his group, Agent 2 212 for help. Agent 1 208 calls Agent 2 212 for a consultation 224. When Agent 1 208 consults with Agent 2 212, Agent 1 208 may share only the relevant context in the dialog. Agent 1 208 may not share original context with Agent 2 212 during the consultation 224. Once the consultation 224 is completed, the call between Agent 1 208 and Agent 2 212 may be terminated.

If Agent 2 212 doesn't give Agent 1 208 a definite answer to the question during the consultation 224, Agent 1 208 may decide to ask Agent 3 216. Agent 1 208 may initiate an interaction 228 with Agent 3 216. Agent 1 208 may share the relevant context in the interaction 228, asking Agent 3 216 to answer the question. Agent 3 216 knows the answer to the question and additional details. During the interaction 228, Agent 3 216 agrees to talk to the Caller 204. Agent 1 208 decides that it may be in his best interest to transfer the Caller 204 to Agent 3 216. When Agent 1 208 transfers 228 the Caller 204 to Agent 3 216, Agent 1 208 may send an in-dialog REFER-R to the Caller 204 that contains transitive context. The Caller 204 may initiate a dialog request 220 to Agent 3 216, and may copy the relegate context to the dialog creating request, INVITE-R. Relative and transitive contexts are present in the call dialog between Agent 3 216 and Caller 204. After Agent 3 216 answers the question and provides all relevant details to the Caller 204, the call may be terminated.

FIG. 2B is an example of a consult call and context continuation 200B where a redirected UA does not support an enterprise-specific-context extension (or custom context extension). In this non-limiting example, a call comes into a contact center. A Caller 204 speaks with Agent 1 208. A context can be created as a result of the interaction 230 between the Caller 204 and Agent 1 208. Agent 1 208 may not have an answer to a question presented by the Caller 204. Agent 1 208 decides that the best course of action may be to ask another member of his group, Agent 2 212 for help. Agent 1 208 calls Agent 2 212 for a consultation 234. When Agent 1 208 consults with Agent 2 212, Agent 1 208 may share only the relevant context in the dialog. Agent 1 208 may not share original context with Agent 2 212 during the consultation 234. Once the consultation 234 is completed, the call between Agent 1 208 and Agent 2 212 may be terminated.

If Agent 2 212 doesn't give Agent 1 208 a definite answer to the question during the consultation 234, Agent 1 208 may decide to ask Agent 3 216 for assistance. Agent 1 208 may initiate an interaction 238 with Agent 3 216 by either calling Agent 3 216 in a separate dialog, transferring caller 204 to Agent 3 216, or conferencing Agent 3 216 with caller 204 and Agent 1 208. Agent 1 208 may share the relevant context in the interaction 238, asking Agent 3 216 to answer the question. In this example, Agent 3 216 knows the answer to the question and additional details. During the interaction 238, Agent 3 216 agrees to talk to the Caller 204. Agent 1 208 decides that it may be in his best interest to transfer the Caller 204 to Agent 3 216. When Agent 1 208 transfers 238 the Caller 204 to Agent 3 216, Agent 1 208 may refresh the interaction dialog with transitive context of type: consume. Agent 1 208 may send an in-dialog REFER-R to the Caller 204 with no transitive context. The Caller 204 may initiate a dialog 230 creating request INVITE-R to Agent 3 216. Agent 3 216 may apply the transitive context that Agent 1 208 shared to a replaced dialog 238. Transitive context is present in the call dialog between Agent 3 216 and Caller 204. After Agent 3 216 answers the question and provides all relevant details to the Caller 204, the call may be terminated.

FIG. 3A is an example of a blind transfer call and context continuation 300A where a redirected UA supports an avaya-context extension. In another non-limiting example, a call comes into a contact center. A Caller 304 speaks with Agent 1 308. A context can be created as a result of the interaction 320 between the Caller 304 and Agent 1 308. Agent 1 308 realizes that the call is a service call, and Agent 1 308 makes a decision to transfer the call to a service agent. Agent 2 312 may be more appropriately suited to take a service call.

Agent 1 308 may initiate a blind transfer to Agent 2 312. Agent 1 308 may include the transitive context in an in-dialog REFER method. The Caller 304 may initiate a dialog creating request 316 to Agent 2 312 and may copy relegate context to the dialog creating request 316. After Agent 2 312 answers the question and provides all relevant details to the Caller 304, the call may be terminated.

FIG. 3B is an example of a blind transfer call and context continuation 300B where a redirected UA does not support an avaya-context extension. In another non-limiting example, a call comes into a contact center. A Caller 304 speaks with Agent 1 308. A context can be created as a result of the interaction 328 between the Caller 304 and Agent 1 308. Agent 1 308 realizes that he is not the best agent to take the call and initiates an ephemeral dialog request 328 to Agent 2 312 in which Agent 1 308 may share a transitive context in the ephemeral dialog 328 that includes type: consume. Agent 1 308 a transfer procedure 324 to send the Caller 304 to Agent 2 312. Agent 1 308 may send the REFER-R to the Caller 304 without any context in the interaction 328. The Caller 304 may initiate a dialog creating request INVITE-R 324 to Agent 2 312. Agent 2 312 may transfer the transitive context from the replaced dialog 328 to a new dialog 324. As there is a context to be conveyed in the example above and the redirected UA does not support the avaya-context extension, the redirecting UA modifies the flow by using the consult transfer flow for the blind transfer feature.

FIG. 4 is a non-limiting example of a SIP REFER method message 404 from a redirecting UA to a redirected UA, and FIG. 5 is a non-limiting example of a resulting SIP INVITE message 504 from the redirected UA to a target UA or directly from redirecting UA to target UA.

There are two supported patterns providing context in SIP signaling. In the first supported pattern, the redirecting UA may convey context to the target UA via the redirected UA. The redirecting UA may convey the context to the target UA via the redirected UA.

To include specific headers in the redirected requests, the redirecting UA may include header names and values encoded in ampersand separated hname=hvalue pairs in the Refer-To header (standard behavior). If the size of the Refer-To header is more than a predetermined size, the redirecting UA may include the headers in a body part with content type of 'application/avaya-context' containing a <sipfrag> with the Content-Disposition relegate. To include a multi-part attachment in the redirected request, the Redirecting UA may include the multi-part attachment as a <message-body> within a body part with the content type of application/avaya-context containing a <sipfrag> with the Content-Disposition relegate.

In a newly created request, the redirected UA may include the ampersand separated headers from the Refer-To header. If the REFER request contains a body with type application/avaya-context and content disposition relegate or multipart/mixed containing a part that has type application/avaya-context, the redirected UA may include the headers and attachment from the application/avaya-context attachment body part. If the body part contains <CRLF>, it is considered to contain a (possibly empty)<message-body> that is to be transferred to the new request. The <sipfrag> of the body part, with any <message-header>s removed, is called the R-body, which is considered to have content type application/avaya-context. The body that would be in the generated request if the R-body was not present is called a G-body. If the G-body is not present, the R-body may become the body of the generated request. If the G-body is of type multipart/mixed, the R-body may be added as a sub-part of the G-body. In all other cases, the body of the generated request can be of type multipart/mixed, with one part being the G-body and the other part being the R-body.

In a second supported pattern, the redirecting UA may convey context directly to the target UA. After communicating the context, the redirecting UA may redirect the redirected UA to the target UA.

The redirecting UA may directly convey the context to the target UA. To convey the context for a dialog that replaces a current dialog between the redirecting UA and the target UA, the redirecting UA may include the attachment as the <message-body> within a body part with the content type of application/avaya-context containing a <sipfrag> with the Content-Disposition consume. The redirecting UA may include the context for the redirected UA in the request. The context may be carried with the Content-Disposition relegate.

Upon receiving a new INVITE-R request, the target UA may apply transitive context (type: consume) to the newly created dialog. If the dialog being replaced contains the transitive context of type relegate, the target UA may refresh the newly created dialog to convey the context to the redirected, or peer UA.

In a determination of UA capability, an element that implements the call context conveyance will indicate it by including a header: Accept: application/avaya-context. Implementation of multipart/mixed is mandatory based on RFC 5621, the entire contents of which are hereby incorporated herein by reference. The implementation may be indicated by: Accept: multipart/mixed or Accept: multipart/*.

If a body of a request (1) has type application/avaya-context, or (2) has type multipart/mixed containing a part that has type application/avaya-context, the body may contain headers and/or a body to be incorporated into a generated request by the context originator/director. The body is formatted as a <sipfrag> with no<start-line> (Refer to RFC 3420 for information on message/sipfrag Multipurpose Internet Mail Extensions, the entire contents of which are hereby incorporated herein by reference). The meaning, processing, and validity of <message-header>s in the body part are as if they are additional <headers> appended (in order) to the URI portion of the Refer-To header in the request. For each <message-header>, the <header-name>, with necessary %-escaping applied, may become the <hname> of a <header>, and the <header-value>, with necessary %-escaping applied, becomes the <hvalue> of the <header>.

The approach described herein is unique in terms of providing context in environments where knowledge is critical and needs to be delivered efficiently.

Figure 6:
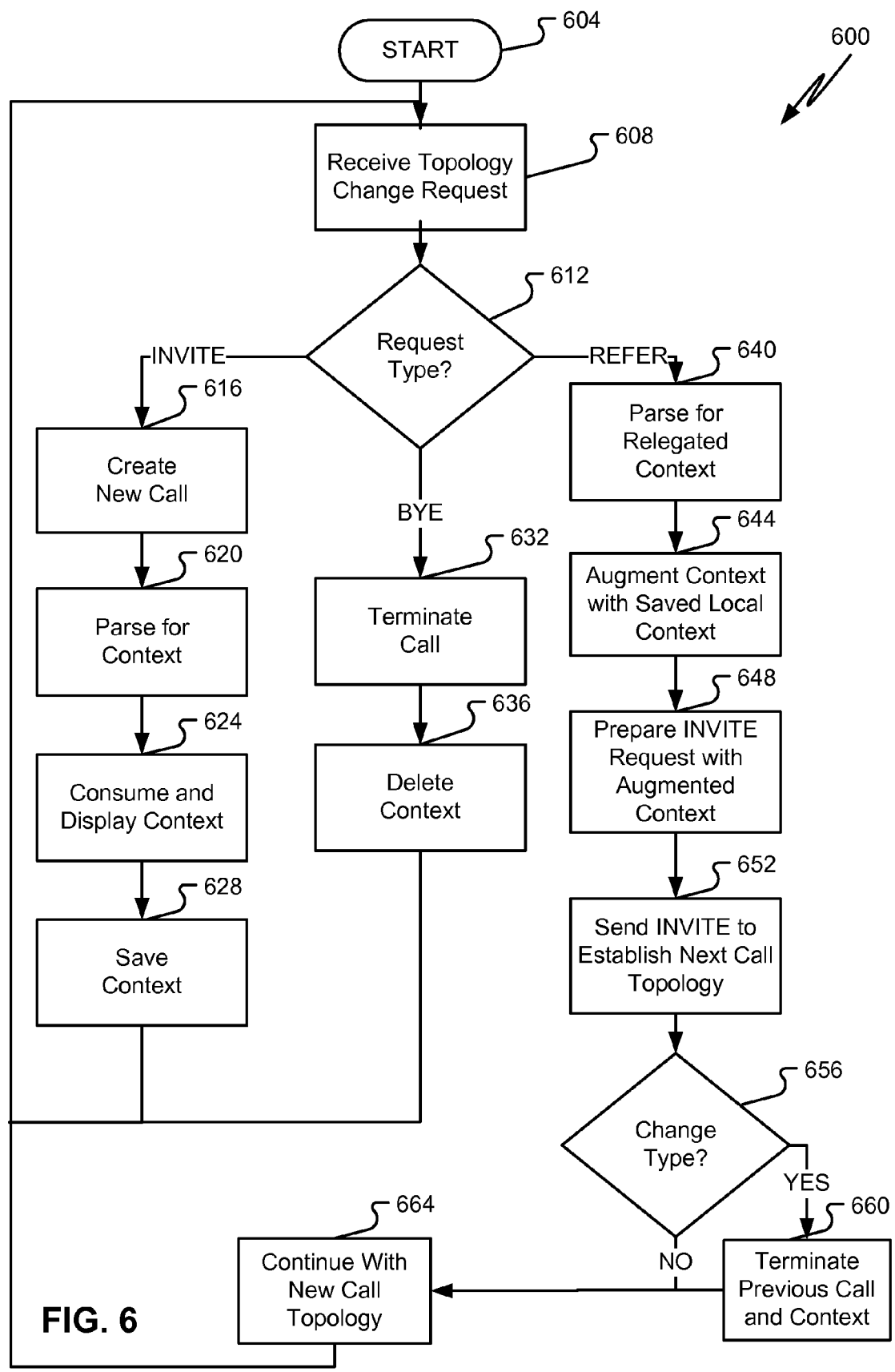
FIG. 6 is a flow diagram for call context conveyance for incoming topology change requests in accordance with embodiments of the present disclosure.

With reference now to FIG. 6, aspects of a method of call context conveyance for incoming topology change requests are depicted in accordance with embodiments of the present disclosure. Generally, the method 600 begins with a start operation 604. While a general order for the steps of the method 600 are shown in FIG. 6, the method 600 can include more or fewer steps or the order of the steps can be arranged differently than those shown in FIG. 6. The method 600 can be executed as a set of computer-executable instructions executed by a computer system and encoded or stored on a non-transitory computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 600 shall be explained with reference to the systems, components, modules, software, structures, etc. described in conjunction with FIGS. 1-5.

Generally, the method begins at step 604 and continues when a SIP call request is sent from a caller 204 on a customer communication device 112 in the form of a call and received by a contact center. The contact center communication server 116, one of a plurality of other servers 136, and/or an internal user/agent 208 on a communication device 132 may receive topology change requests in the form of a SIP INVITE message, a SIP BYE message, and a SIP REFER message, in step 608. In step 612, the communication server 116 may make an assessment as to the request type (INVITE, BYE, REFER) and may additionally do a user table 124 lookup for the user/agent 208 specified in the call request.

A new call 220 may be created (step 616) for the user/agent 208 based on an INVITE request type. The call 220 created in step 616 may be parsed for context, in step 620. Non-limiting examples of context for parsing might include user/customer name, account, order history, correspondence including social media history, and any related information from the enterprise database 128. The call 220 is operable to consume any available context and the communication server 116 may display the available context (step 624). When the call is established and during the call, the parsed context and collected context may be saved and stored for later use by the contact center, in step 628.

If the request type for the user/agent 208 in step 612 is determined to be a BYE by the communication server 116, an incoming call may be terminated (step 632). If the communication server 116 terminates the call in step 632, the context of the call may be deleted (step 636).

If the request type for the user/agent 208 in step 612 is determined to be a SIP REFER message by the communication server 116, the incoming call 220 may be parsed for relegated context (step 640). In step 644, the new call 220 context may be augmented with saved local context. Non-limited examples of saved local content might include agent notes, research, supervisor recommendations, etc. The communication server 116 may prepare an SIP INVITE message request that can include the augmented context (step 648). The communication server 116 may send the prepared SIP INVITE message request to establish the next call topology, in step 652.

Once the SIP INVITE message request in step 652 has been sent, the communication server 116 may assess whether or not a change type has been requested (step 656). If a change type has been requested (e.g., transfer), in step 656, the previous call and related context may be terminated (step 660). Once the previous call and related context have been terminated, the SIP call flow may continue with the new call topology, in step 664. If a change type has not been requested (e.g., no transfer), the SIP call flow may continue with the new call topology, in step 664. At the deletion of context, continuation, termination and/or release of each call, and saving/storing of context (steps 628, 636, 664), the method may reset and return to the beginning of the method, when a new call topology change request is received (step 608).

Figure 7:
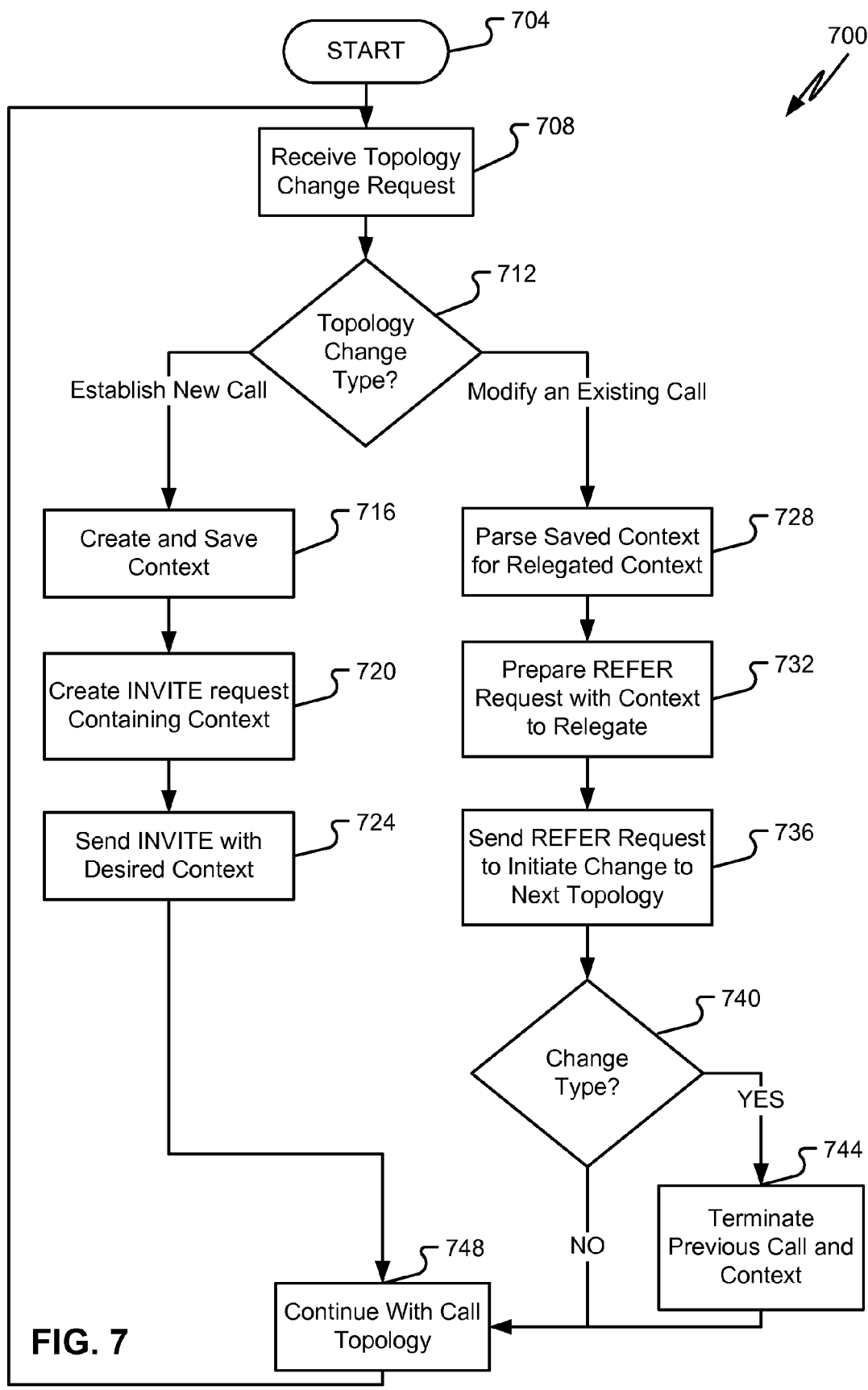
FIG. 7 is a flow diagram for call context conveyance for locally generated topology change requests in accordance with embodiments of the present disclosure.

With reference now to FIG. 7, aspects of a method of call context conveyance for locally generated topology change requests are depicted in accordance with embodiments of the present disclosure. Generally, the method 700 begins with a start operation 704. While a general order for the steps of the method 700 are shown in FIG. 7, the method 700 can include more or fewer steps or the order of the steps can be arranged differently than those shown in FIG. 7. The method 700 can be executed as a set of computer-executable instructions executed by a computer system and encoded or stored on a non-transitory computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 700 shall be explained with reference to the systems, components, modules, software, structures, etc. described in conjunction with FIGS. 1-6.

Generally, the method begins at step 704 and continues when a SIP topology change request is detected from an Agent 308 on a communication device 132. The communication device 132 may detect the SIP topology change request, in step 708. In step 712, the communication device 132 may make an assessment as to the topology change type, as to whether a new call should be established or whether an existing call should be modified. If a new call is established in step 716, contextual information may be created and saved. A SIP INVITE message request containing the newly created contextual information may be created (step 720). The communication device 132 may send the SIP INVITE message with the desired contextual information to the requested user, in step 724, and a call may be established. The call may be delivered to the requested user agent 312 and then continued with the existing call topology, in step 748.

If the request is for a call topology to be modified in step 712, any available saved context may be parsed for relegated context (step 728). The communication device 132 may prepare a SIP REFER message request with context to relegate, in step 732. The SIP REFER message request may be sent in step 736 to initiate a change to a subsequent topology.

In step 740, the communication device 132 may make an assessment as to whether or not a change type is needed. If a change type is needed (e.g., transfer), the previous call may be terminated along with the associated context (step 744). If a change type is not needed (e.g., no transfer), the call may continue with the current call topology and context, in step 748. If another call topology change is requested after step 748, the method may begin again (step 708).

The call context conveyance communication system, method, and components allow call topology and participant changes, described as context, to be carried, communicated, and/or discarded in dialogs with new and existing participant user agents.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method of exchanging context information, the method comprising:
    obtaining transitive context information, by a telecommunications server of a communication system, for a first call involving a first user and a second user, but not a third user;
    configuring, by the telecommunications server, a Session Initiation Protocol (SIP) message to be transmitted in connection with establishment of the first call;
    including, by the telecommunications server, the transitive context information in the SIP message configured, by the telecommunications server, to be transmitted in connection with establishing a second call between the third user and at least one of the first user and the second user;
    wherein the transitive context information is associated with one of two categories of transitive context information:1) consume or 2) relegate; and
    wherein the transitive context information includes a data element that conveys notes about the call, wherein the at least some of the notes are created by at least one of the first and second users involved in the first call, and wherein the at least some of the notes are used in the second call that occurs after the first call in which the data element is included is completed.

2. The method of claim 1, wherein the transitive context information is obtained for both (i) the first call involving the first user and the second user as well as (ii) the second call involving the first user and the third user, and wherein the SIP message is configured, by the telecommunications server, to be transmitted in connection with establishing the third call between the second user and the third user.

3. The method of claim 1, wherein the transitive context information is obtained in the absence of a call, and wherein the SIP message is configured, by the telecommunications server, to be transmitted in connection with establishing the second call between the second user and the third user.

4. The method of claim 1, wherein the transitive context information is identified as being consume context and wherein the transitive context information is used in at least one of the second call by the second user, in the third call by the second user, and in the first call by the second user.

5. The method of claim 1, wherein the transitive context information is identified as being relegate context and wherein the method further comprises:
    conveying, by the telecommunications server, at least some of the transitive context information from the SIP message to a target user of the call thereby providing the target user with contextual information about the incoming call.

6. The method of claim 1, wherein the transitive context information is included, by the telecommunications server, in the at least one of a Content-Disposition header of the SIP message and a MIME attachment in the SIP message.

7. The method of claim 1, wherein the SIP message comprises at least one of an INVITE message, an INVITE with Replaces message, an INVITE with Join message, a REFER message, a REFER with Replaces message, and a REFER with Join message.

8. The method of claim 1, wherein the transitive context information is obtained, by the telecommunications server, in response to the first call changing topology from a first configuration to a second configuration.

9. A system comprising a telecommunications server and the telecommunications server further comprises:
- means to obtain transitive context information for a first call involving a first user and a second user, but not a third user;
- means to configure a Session Initiation Protocol (SIP) message to be transmitted in connection with establishment of the first call;
- means to include the transitive context information in the SIP message configured to be transmitted in connection with establishing a second call between the third user and at least one of the first user and the second user;
- wherein the transitive context information is associated with one of two categories of transitive context information: (1) consume or (2) relegate; and
- wherein the transitive context information includes a data element that conveys notes about the call, wherein at least some of the notes are created by at least one of the first and second users involved in the first call, and wherein the at least some of the notes are used in second call that occurs after the first call in which the data element is included is completed.

10. The system of claim 9, wherein the means to obtain the transitive context information further comprises means to obtain the transitive context information for the first call involving the first user and the second user, but not the third user and further comprising means to configure the SIP message to be transmitted in connection with establishing the second call between the third user and at least one of the first user and the second user.

11. The system of claim 9, wherein the means to obtain the transitive context information comprises means to obtain both (i) the first call involving the first user and the second user as well as (ii) the second call involving the first user and the third user, wherein the SIP message is configured to be transmitted in connection with establishing the third call between the second user and the third user, and means to obtain the transitive context information in the absence of a call and further comprising means to configure the SIP message to be transmitted in connection with establishing the first call between the first user and the second user.

12. The system of claim 9, wherein a means to identify the transitive context information as being consume context and further comprising means to use the transitive context information in at least one of the second call by the second user, in the third call by the second user, and in the first call by the second user.

13. The system of claim 9, wherein a means to identify the transitive context information as being relegate context and further comprising:
- means to convey for conveying at least some of the transitive context information from the SIP message to a target user of the call thereby providing the target user with contextual information about the incoming call.

14. A communication system, comprising:
- a transfer hardware configured to obtain transitive context information obtained for a first call involving a first user and a second user, but not a third user and performs the following operations:
- configure a Session Initiation Protocol (SIP) message to be transmitted in connection with establishment of a second call between the third user and at least one of the first user and the second user;
- wherein the transitive context information from the first call is included in the SIP message; and
- wherein the transitive context information from the first call is identified as belonging to one of two categories of transitive context information: (1) consume and (2) relegate; and
- wherein the transitive context information includes a data element that conveys notes about the first call, wherein the notes are created by at least one of the first and second users involved in the first call, and wherein the notes are used in the second call that occurs after the first call in which the data element is included is completed.

15. The system of claim 14, wherein the transfer hardware is further configured to
- convey at least some of the transitive context information from the SIP message to a target user of the call thereby providing the target user with contextual information about the incoming call.

16. The system of claim 14, wherein the transitive context information is included in the at least one of a Content-Disposition header of the SIP message and a MIME attachment in the SIP message, and wherein the SIP message comprises at least one of an INVITE message, an INVITE with Replaces message, an INVITE with Join message, a REFER message, a REFER with Replaces message, and a REFER with Join message.

17. The system of claim 14, wherein the transitive context information is obtained for both (i) the first call involving the first user and the second user as well as (ii) the second call involving the first user and the third user, and wherein the SIP message is configured, by a telecommunications server, to be transmitted in connection with establishing the third call between the second user and the third user.

18. The system of claim 14, wherein the transitive context information is obtained in the absence of a call, and wherein the SIP message is configured, by a telecommunications server, to be transmitted in connection with establishing the second call between the second user and the third user.

19. The system of claim 14, wherein the transitive context information is identified as being consume context and wherein the transitive context information is used in at least one of the second call by the second user, in the third call by the second user, and in the first call by the second user.

20. The system of claim 14, wherein the transitive context information is obtained, by a telecommunications server, in response to the first call changing topology from a first configuration to a second configuration.

* * * * *